United States Patent Office
3,600,349
Patented Aug. 17, 1971

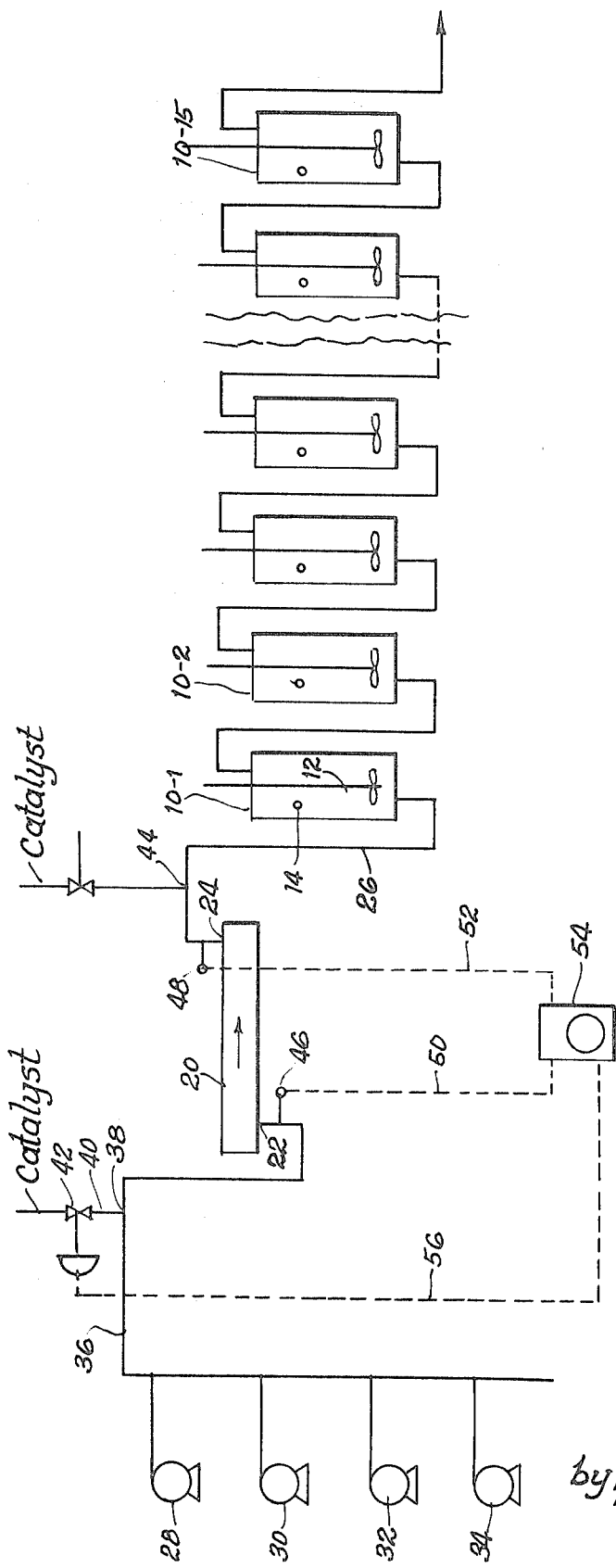

3,600,349
METHOD FOR CONTROLLING REACTION RATE IN AQUEOUS EMULSION POLYMERIZATION TO FORM ELASTOMERIC POLYMERS
John M. Stone, Baton Rouge, La., assignor to Copolymer Rubber & Chemical Corporation, Baton Rouge, La.
Filed May 1, 1969, Ser. No. 820,868
Int. Cl. C08d 7/00, 1/09; B08f 1/13
U.S. Cl. 260—29.7
7 Claims

ABSTRACT OF THE DISCLOSURE

Means and method for controlling reaction rate in the polymerization to form elastomeric polymers and copolymers of butadiene in which use is made of a pre-reactor in advance of the reaction vessels through which the monomeric materials are caused to flow with a small fraction of the catalyst and measurement is made of the temperature rise generated by the exothermic reaction for adjustment of the catalyst additions to control reaction rate.

---

This invention relates to synthetic rubbers and to the method for preparation of same and more particularly to the preparation of synthetic rubbers by polymerization of suitable monomers in a continuous operation and to a method for automatic control of the amount and rate of polymer formation whereby a rubber of uniform characteristics is produced.

It is an object of this invention to provide a means and method for the polymerization of monomers in the preparation of elastomeric polymers in a continuous operation wherein means are employed, during an initial stage of the polymerization process, for automatically controlling the amount and rate of polymerization during the entire polymerization process and it is a related object to provide a new and improved continuous process for the preparation of elastomeric polymers in synthetic rubber formation, in which variations in reaction rate are reduced, and in which relatively uniform levels of conversion to a desired end point can be achieved.

These and other objects and advantages of this invention will hereinafter appear and for purposes of illustration, but not of limitation, a flow diagram of a representative process is given in the accompanying drawing.

The invention is applicable to the preparation of synthetic rubbers by the aqueous emulsion polymerization of monomeric materials which produce latices of a synthetic polymer by polymerization in aqueous medium in the presence of micelle producing surfactants and polymerization catalyst. Representative of monomeric materials of which elastomeric polymers can be formed are chloroprene, various of the conjugated butadienes, such as 1,3-butadiene, methyl-2-butadiene 1,3-piperylene, and 2,3-dimethylbutadiene, mixtures of such conjugated butadienes with other copolymerizable monomers, such as up to 50% or more by weight of a monomer which contains a mono-olefinic group, as represented by the formula

wherein at least one of the disconnected valences is attached to an electroactive group, i.e. a group which substantially increases the electrical dissymmetry or polar character of the molecule. Representative of such mono-olefinic monomers which may be copolymerized with butadiene monomers are aryl olefins, such as styrene and vinyl naphthalene, alpha-methyl carboxylic acids and their corresponding esters, nitriles and amides, such as acrylic acid, methacrylates, methyl methacrylate, acrylonitrile, methacrylonitrile, methacrylamide, and the like; isobutylene, methyl vinyl ether and methyl vinyl ketone. In some instances, the monomeric material may be a single mono-olefinic compound containing the group

or a mixture of such compounds.

The polymerizable monomeric materials of this invention may be referred to herein as being selected of the group consisting of chloroprene, conjugated diolefins which are homopolymerizable to produce elastomeric polymers, or mixtures thereof with monoethylenically unsaturated monomers capable of producing copolymers therewith, and preferably rubbery polymers and copolymers. The invention is preferably practiced in a process for the production of rubber copolymers of butadiene and styrene in which the styrene is present in an amount up to 50% by weight with the remainder 1,3-butadiene to form a butadiene-styrene copolymer, generally referred to as SBR rubber.

The composition of polymerizable monomers is formulated to contain one or more micelle forming surfactants of the type generally employed in emulsion polymerization of the type described. Representative are the fatty acid soaps and preferably water soluble long chain fatty acid soaps, such as sodium or potassium soaps of lauric, myristic, palmitic, oleic, stearic acids and the like; tall oil acids and rosins. Use can also be made of a secondary emulsifier such as one or a number of well known detergents, as represented by alkali metal sulfonates of aryl sulfonic acids, such as sodium alkyl naphthalene sulfonate.

The polymerizable composition is also formulated to contain a polymerization catalyst of the type commercially employed in such emulsion polymerization of elastomer forming monomers. Such catalyst can be a free radical initiator, as represented by organic hydroperoxides, such as paramethyl hydroperoxide, cumene hydroperoxide, diisopropyl benzene hydroperoxide and the like. Use can also be made of an activator in redox combination, such as ferrous sulfate or other suitable ionizable heavy metal salt.

It is desirable to make use of as little surfactant as possible. For example, it is preferred that the primary emulsifier, as represented by a fatty acid soap or rosinate, be maintained within a range of about 1 to 3 parts by weight per 100 parts by weight of monomer and that any secondary emulsifier be maintained within the range of about 0 to 0.2 part by weight per 100 parts by weight of monomer. The surfactant should be maintained at sufficiently low levels so that, as the polymerization proceeds, the polymerizing mixture passes through a viscous stage during which it may be readily agglomerated by intense agitation, followed by a reduction in viscosity and release of free surfactant into the aqueous phase.

It has been discovered that a reaction rate monomer can be established in a pre-reactor into which a fraction of the catalyst is introduced to the monomer to initiate polymerization and that the temperature differential established in the model by the exothermic polymerization reaction taking place can be employed as a measure of the amount of monomer conversion achieved in the pre-reactor, whereby the temperature differential can be adapted as a feed forward control to determine the reaction rate and the reactor charge stock reactivity and thereby regulate the amount of catalyst addition to achieve the calculated reaction rate and set point reactivity specified for the desired product. When the pre-reactor is combined with an in-line process computer responsive to temperature and heat balance data determined on the latex passing therethrough, an automatic feed forward control of reactivity to the reactor system is provided which is responsive to effect balance control within a few minutes, as compared to other reaction rate control techniques having a time lag of the order of several hours.

The foregoing is characteristic of a continuous polymerization process, as represented by the manufacture of an SBR rubber having the following typical formulation:

| Ingredient: | Parts by weight [1] |
|---|---|
| Butadiene | 70 |
| Styrene | 30 |
| Rosin soap | 4.5 |
| Potassium chloride (muriate of potash) | 0.2 |
| Trisodium phosphate (anhydrous) | 0.2 |
| Sodium alkyl naphthalene sulfonate | 0.09 |
| Tetrasodium salt of ethylene diamine tetraacetic acid | 0.02 |
| Paramenthane hydroperoxide | 0.05 |
| Sodium formaldehyde sulfoxylate | 0.05 |
| Activator solution [2] | 0.90 |
| Modifier (tertiary mercaptan) | 0.17 |
| Sodium hydrosulfite | 0.02 |
| Water | 200.00 |

[1] Based on total monomer.
[2] The activator was a solution of 1.27 grams of sodium hydroxide, 2.31 grams of ethylenediamine tetraacetic acid and 2.0 grams of ferrous sulfate hepta hydrate in water made up to 100 ml.

A GRS latex was prepared by the conventional cold rubber process using the recipe of the foregoing example with the polymerization being carried out at a temperature of about 40–60° F. and preferably about 43–45° F. In the hot rubber process, the reaction temperature may be within the range of 60–150° F. The polymerization was short-stopped at 55–60% conversion and the unreacted monomers were removed by conventional flashing and stripping.

It will be understood that other recipes may be used for the polymerization of butadiene polymers and copolymers. An electrolyte may be present if desired, although it is preferred to omit the electrolyte for the production of foamed rubber having improved properties. For additional recipes and methods of preparation, reference can be made to U.S. Patents No. 3,214,401, No. 3,272,768 and No. 3,247,146.

Having set forth the theoretical concepts of the invention, description will now be given in greater detail with reference to the schematic flow diagram of a substantially continuous operation for the preparation of an SBR rubber wherein use is made of a chain of reaction vessels 10–1, 10–2 to 10–15, in which copolymerization takes place as the composition undergoing polymerization flows from one vessel to the next with the polymerization calculated to be completed for short-stopping by the time reaches the final vessel in the chain. Each vessel is provided with a stirrer 12 and a temperature sensing means 14 for measuring the progress of the polymerization and for controlling the polymerization conditions existing within the vessel.

In advance of the first reaction vessel 10–1, there is provided a pre-reactor or pre-initiator 20 in the form of an elongate tubular member having an inlet 22 at one end portion and an outlet 24 at the opposite end portion with the latter being connected by piping 26 to the inlet at the bottom side of the first reaction vessel 10–1 in the chain.

All of the ingredients with the exception of the material or materials to be used to regulate the reaction rate which may include catalyst, surfactant and/or initiator are metered through feed pumps 28, 30, 32, 34, etc. into a feed pipe 36 which communicates with the inlet 22 of the prereactor for the continuous introduction of the monomeric polymerizable system into the reactor.

The feed pipe 36 is provided with an inlet 38 beyond the pumps but in advance of the pre-reactor for introduction of the catalytic system through the feed pipe 40 at a rate controlled by the valve member 42 while the pipe 26, beyond the pre-reactor, is provided with an inlet 44 for the introduction of additional catalytic system after the pre-reacted ingredients have traversed the pre-reactor.

Temperature sensing means 46 and 48 are respectively provided for measuring the temperature rise that occurs during passage of the polymerizable materials through the pre-reactor. For this purpose, the one temperature sensing means 46 can be provided at the inlet portion to the pre-reactor and preferably in the feed line immediately prior to the inlet 22 while the other temperature sensing means 48 is arranged to measure the temperature of the liquid polymerizable material after initiation has been completed and preferably in the line 26 immediately adjacent the outlet 24 from the pre-reactor.

The temperature sensing means 46 and 48 are connected through lines 50 and 52 to a controller recorder 54 or computer wherein the temperature differential is calculated and computerized for operation through line 56 of a flow regulator 42 for the catalyst feed. In order to give significance to the temperature differential of the polymerizable liquids flowing through the pre-reactor, it is essential to provide adequate residence time, as by means of regulating flow rate to reactor volume ratio of the pre-reactor, which will enable conversion for the formation of polymer particles to be completed before the polymerizable materials leave the reactor. For the computation, it is desirable to known the total volume-flow rate through the pre-reactor; the heat of formation of the polymerizing polymer; the heat capacity of the reaction medium; the monomer concentration in the charge to the reactor and the effect of temperature change on reaction rate, all of which should be taken into consideration in the computation, except for such conditions as may be fixed. In order to minimize external heat losses from the pre-reactor, it is desirable thermally to insulate the reactor.

For most practical purposes with a recipe of the type described, it is desirable to operate with a residence time of less than 10 minutes and preferably within the range of 4–10 minutes and to operate within a range of temperature of 1–10° F.

In the pre-reactor, the activator, preferably in the form of a complex iron salt, introduced as a part of the catalytic system, is free to initiate the formation of polymer particles. Such initiation, which depends upon the amount of catalyst introduced, represents an exothermic reaction which brings about a temperature rise as the reaction takes place during passage of the polymerizable materials through the pre-reactor. Thereafter, any further addittions of soap or catalyst will go only to the particles which have already been formed during passage through the pre-reactor, such that very few, if any, particles are initiated by reason of the subsequent addition of catalyst to the polymerizable material advanced to the first reaction vessel 10–1 or added in increments as the polymerizable liquid flows from vessel to vessel.

Thus the number of particles initiated will be dependent upon the amount of catalyst introduced into the liquid monomeric system continuously fed into the pre-reactor or the feed ratio of catalyst to the feed rate of monomers in the continuous polymerization process. The temperature rise that takes place in the reaction to initiate the formation of particles in the pre-reactor is measured by the sensors and determined by the controller.

From the temperature rise, and the conditions previously described, the pounds of polymer capable of being formed per minute can be computed and from this data one can calculate the actual reaction rate at effluent temperature which can then be converted to reaction rate at standard temperature.

In practice, the amount of catalyst introduced to fix the rate will correspond to about ⅓ to ⅕ and preferably about ¼ of the total catalyst utilized in the polymerization reaction with the remainder introduced after the pre-initiation reaction, either in increments between reaction vessels or preferably in its entirety before the first reaction vessel.

The following data has been derived from the preparation of an SBR rubber in a continuous operation with a normal pre-initiator catalyst feed containing activator iron salts, at a rate of 0.27 part per 100 parts by weight of monomer, followed by a period in which the rate of catalyst addition before the pre-reactor was reduced from 0.027 to 0.015 part per 100 parts by weight of monomer. This was followed further by a period in which the rate of catalyst addition was increased from the reduced rate of 0.015 to 0.027 part per 100 parts by weight of monomer.

| Time | Monomer conversion in vessel, lbs. polymer/100 lbs. monomer | Reaction rate at measured temp., lbs. polymer/100 lbs. monomer/min. | Temperature rise in vessel, °F. | Calculated pmhp addition, parts/100 parts monomer |
|---|---|---|---|---|
| 0656 | 1.119 | 0.2383 | 2.666 | .0107 |
| 0701 | 1.312 | .2822 | 2.659 | .0107 |
| 0706 | 1.482 | .3203 | 3.002 | .0098 |
| 0711 | 1.463 | .3164 | 2.961 | .0088 |
| 0716 | 1.172 | .2500 | 2.373 | .0107 |
| 0721 | 1.144 | .2432 | 2.314 | .0117 |
| 0726 | 1.440 | .3105 | 2.914 | .0098 |
| 0731 | 1.635 | .3555 | 3.310 | .0088 |
| 0736 | 1.517 | .3281 | 3.074 | .0078 |
| 0736 | Decreased activator from 0.027 to 0.015 part time | | | |
| 0741 | 1.163 | .2480 | 2.356 | .0098 |
| 0746 | .945 | .2002 | 1.914 | .0127 |
| 0751 | .936 | .1982 | 1.897 | .0156 |
| 0756 | 1.015 | .2148 | 2.053 | .0166 |
| 0801 | .938 | .1982 | 1.896 | .0195 |
| 0806 | 1.040 | .2217 | 2.103 | .0205 |
| 0811 | 1.102 | .2344 | 2.230 | .0215 |
| 0816 | 1.119 | .2383 | 2.267 | .0225 |
| 0818 | Increased activator from 0.015 to 0.027 part iron | | | |
| 0821 | .972 | .2061 | 1.970 | .0273 |
| 0826 | 1.104 | .2354 | 2.233 | .0273 |
| 0831 | 1.671 | .3643 | 3.383 | .0195 |
| 0836 | 1.950 | .4297 | 3.952 | .0146 |
| 0841 | 1.886 | .4141 | 3.823 | .0127 |
| 0846 | 1.8408 | .4043 | 3.733 | .0117 |
| 0851 | 1.798 | .3936 | 3.644 | .0098 |
| 0856 | 1.971 | .4346 | 3.992 | .0078 |
| 0901 | 2.054 | .4541 | 4.161 | .0068 |

It will be observed that the temperature rise in the pre-reactor is somewhat proportional to the conversion rate and the calculated reaction rate. It will be further observed that decrease in temperature differential of the materials passing through the pre-reactor, indicative of a decrease in monomer conversion and reaction rate, automatically brings about an increase in the rate of addition in parts of catalyst per 100 parts by weight of monomer to compensate for this reduction in reaction rate and the amount of monomer conversion. Conversely, as the temperature differential increases, indicative of an increase in monomer conversion and reaction rate, the rate of addition of catalyst in parts per 100 parts of monomer automatically decreases to compensate for the increase in monomer conversion and reaction rate.

Thus, when the parameters of reaction rate and conversion are preset for a particular combination of polymerizable ingredients, the rate of introduction of catalyst both before and after the pre-reactor can be automatically controlled in response to the temperature differential as measured during passage of the polymerizable liquid through the pre-reactor.

It will be apparent from the foregoing that I have provided a simple and efficient method and means for effecting polymerization or copolymerization of butadiene type polymers and copolymers to achieve a more uniform conversion level for a predetermined end point. The described system represents a feed back controlling system with respect to means for maintaining a uniform reaction rate while at the same time providing a feed forward control of reactivity to the reactor system which is substantially immediately responsive to maintain uniform conversion levels.

It will be understood that changes may be made in the details of construction, arrangement and operation without departing from the spirit of the invention especially as defined in the following claims.

I claim:

1. In the aqueous emulsion polymerization to form elastomeric polymers and copolymers of butadiene in the presence of a catalytic system containing a surfactant and activator, the steps of passing the monomeric materials through an elongate passage which is insulated to minimize heat loss, introducing a small fraction of the catalyst into the monomeric material prior to flow through the passage to effect conversion of monomer to form polymer particles during flow through the passage, measuring the rise in temperature resulting from the exothermic reaction during flow through the passage for determination of reaction rate, adding the remainder of the catalyst to the polymerizable material subsequent to flow through the passage to carry out the polymerization reaction, adjusting the amount of catalyst in response to measurement of temperature change, and polymerizing the monomeric material to the corresponding polymer.

2. The process as claimed in claim 1 in which the passage represents a pre-reactor in the form of a tubular member located in advance of the polymerization reaction vessels.

3. The process as claimed in claim 1 in which the temperature rise is determined by measuring the temperature of the monomeric materials adjacent the entrance end of the passage and adjacent the exit end of the passage to measure the exothermic reaction taking place during flow of the materials through the passage.

4. The process as claimed in claim 1 in which the amount of catalyst added before flow through the passage corresponds to an amount within the range of ⅓ to ⅕ of the total catalyst used in the polymerization reaction.

5. The process as claimed in claim 1 in which the catalyst is added to the monomeric materials before entrance into the passage.

6. The process as claimed in 1 in which the remainder of the catalyst is added in a single increment subsequent to flow of the polymerizable materials through the passage.

7. The process as claimed in claim 1 in which the remainder of the catalyst is added in separate increments.

References Cited
UNITED STATES PATENTS

| | | | |
|---|---|---|---|
| 3,220,998 | 11/1965 | Berger | 260—94.3 |
| 3,226,378 | 12/1965 | Smith | 260—94.3 |
| 3,257,375 | 6/1966 | Norwood | 260—94.9 |

JAMES A. SEIDLECK, Primary Examiner

W. F. HAMROCK, Assistant Examiner

U.S. Cl. X.R.

23—284; 260—82.1, 82.3, 83.5, 83.7, 92.3, 94.2, 95